(12) United States Patent
Sampathkumaran et al.

(10) Patent No.: US 11,021,615 B2
(45) Date of Patent: Jun. 1, 2021

(54) REMOVABLE SMART SEQUESTRATION COATINGS FOR HAZARDOUS METALS

(71) Applicant: INNOSENSE LLC, Torrance, CA (US)

(72) Inventors: Uma Sampathkumaran, Torrance, CA (US); Kevin H. Yu, Temple City, CA (US); Raymond Winter, Riverside, CA (US)

(73) Assignee: INNOSENSE LLC, Torrance, CA (US)

(*) Notice: Subject to any disclaimer, the term of this patent is extended or adjusted under 35 U.S.C. 154(b) by 863 days.

(21) Appl. No.: 15/610,219

(22) Filed: May 31, 2017

(65) Prior Publication Data

US 2017/0342277 A1  Nov. 30, 2017

Related U.S. Application Data

(60) Provisional application No. 62/343,354, filed on May 31, 2016.

(51) Int. Cl.
| | |
|---|---|
| *C09D 5/20* | (2006.01) |
| *G01N 31/22* | (2006.01) |
| *G01N 21/78* | (2006.01) |
| *C09D 175/04* | (2006.01) |
| *C09D 5/32* | (2006.01) |
| *C09D 101/28* | (2006.01) |
| *G01N 21/94* | (2006.01) |

(52) U.S. Cl.
CPC .......... *C09D 5/20* (2013.01); *C09D 5/32* (2013.01); *C09D 101/28* (2013.01); *C09D 175/04* (2013.01); *G01N 21/78* (2013.01); *G01N 31/22* (2013.01); *G01N 21/94* (2013.01)

(58) Field of Classification Search
None
See application file for complete search history.

(56) References Cited

U.S. PATENT DOCUMENTS

| | | | | |
|---|---|---|---|---|
| 4,240,992 A | * | 12/1980 | Petrie | C09K 11/02 250/483.1 |
| 8,133,735 B2 | * | 3/2012 | Farmer | C09D 5/08 436/2 |
| 2005/0061357 A1 | | 3/2005 | Steward et al. | |
| 2006/0145091 A1 | * | 7/2006 | Patel | G01T 1/04 250/474.1 |
| 2010/0273197 A1 | * | 10/2010 | Walker | A62D 5/00 435/21 |
| 2014/0023555 A1 | * | 1/2014 | Monzyk | A62D 3/37 422/28 |

* cited by examiner

*Primary Examiner* — Sheng H Davis
(74) *Attorney, Agent, or Firm* — M.J. Ram and Associates (57) ABSTRACT

Materials are disclosed for the safe sequestration and removal of hazardous contaminants from a surface. The materials can be sprayed, rolled, painted, brushed or dip coated onto any surface and allowed to dry and/or cure at room temperature or drying/curing can be accelerated by the application of heat to form a coating that entraps the contaminant therein. The coating and the entrapped contaminant can then peeled from the surface and safely disposed of to minimize hazardous waste. The coating includes a colorimetric additive that is specific to the contaminant, the coating and the contaminant producing a visual indication of contamination.

11 Claims, 10 Drawing Sheets
(9 of 10 Drawing Sheet(s) Filed in Color)

REMOVABLE SMART SEQUESTRATION COATINGS FOR HAZARDOUS METALS

Benefit is claimed of Provisional Application Ser. No. 62/343,354 filed May 31, 2016.

Inventions described herein were made with government support under Grant DE-SC0010238 awarded by U.S. Department of Energy Office of Science. The government has certain rights in the invention.

FIELD OF THE INVENTION

The present disclosure relates to remediation coatings. In particular, the present disclosure is in the field of specialized coatings that can sequester and aid in visible detection of hazardous metal contaminants and other substances. Specifically, described herein are novel coating formulations that can be applied by casting, rolling, dipping, brushing, spraying or other common coating techniques to form a fixative and strippable film that will trap hazardous metals at sequestration sites. The coatings are formulated with colorimetric indicators that aid in detecting the presence of the toxic metals through visible color formation in the coatings for environmental and workplace protection and cleanup efforts.

BACKGROUND

The Department of Energy (DOE) relies on tools and technologies to ensure the safety of personnel who carry out decontamination and decommissioning work at unused nuclear facilities. Strippable, fixative coatings that capture and provide a visual indication of toxic material contaminants, for example elemental mercury and its ions, chromium (Cr), Cadmium (Cd) and lead (Pb), would improve safety and minimize hazards and waste during the demolition process at sites contaminated with these hazards. Currently used fixative or strippable coatings do not provide visual indication. It should be understood that the present materials and procedures described herein are not limited to the sequestration of mercury or any specific toxic metal contaminant. A strippable paint that can be utilized by the DOE-Environmental Management (EM) in the fixing and sealing of mercury and other toxic metal contaminates during the remediation and transport of waste is highly desirable. The strippable film or coating offers beneficial features like dust and particle entrainment, ability to adhere well to many types of surfaces, such as porous, smooth or rough concrete walls and floors, drywall, metal, glass, plastic and wood, with the ability to be easily removed from the surface mechanically by hand or application of moderate force. The strippable coating will also serve as a barrier to sequester the hazardous materials on the surface and decontaminate the surface to a lower hazard level prior to demolition or reuse. This will reduce the amount of airborne contaminated material released during decommissioning and deactivation (D&D) operations. A strippable coating will be easier to contain and dispose of than general construction debris.

The general condition of colorimetric detection of elemental or metallic mercury (Hg) is recognized from the technical literature. There were considerable development efforts for colorimetric determination of Hg and Hg(II) prior to 1995. At that time lower cost atomic absorption (AA) units, often targeted to mercury detection, became generally available, resulting in AA becoming the common standard for Hg determination and AA is the most commonly used technique. Since that time, the only major development for colorimetric determination of mercury has been using nanoscale silver and gold particles and a few complex dyes. For a variety of reasons colorimetry, other than classic colorimetric testing, has been developed for other purposes, but not for use as a strippable coating detection system.

Colorimetric testing for Hg can be divided into two basic approaches:

a) direct colorimetric determination of Hg and b) indirect colorimetric determination by first converting Hg to Hg(II) and subsequent determination of Hg(II).

The classic methods use dithizone for visual colorimetry for Hg. Potassium ferrocyanide and nitrosobenzene are reacted with dithizone, forming mercuric thiocyanate which is observable colorimetrically in the ultraviolet by decolorization of ferric thiocyanate and reading with Michler's ketone. The classic colorimetric reaction for Hg(II) uses dithizone (or diphenylthiocarbazone). Two recent critical review articles discuss the role of fluorescent and colorimetric indicators for toxic metal ion sensing (Kim H. N., Ren W. X., Kim J. S. and Yoon J., "Fluorescent and colorimetric sensors for detection of lead, cadmium, and mercury ions," *Chemical Society Reviews*, 2012, 41:3210-3244) and fluorescent sensors for bioimaging (Yang Y., Zhao Q., Feng W. and Li F., "Luminescent chemidosimeters for bioimaging," *Chemical Reviews*, 2013, 113:192-270). Hg(II) is a soft metal cation, characterized by a soft sphere of highly polarizable electrons in its outer shell. This leads to a preference for ligands of sulfur, the less electronegative halides and nitrogen over ligands containing oxygen (Stumm, W., Morgan, J. J., 1995. *Aquatic Chemistry*, $3^{rd}$ ed. John Wiley and Sons, New York.). The receptors can be categorized as (1) small molecule based sensors, (2) calixarene-based chemosensors; (3) 4,4-difluoro-4-bora-3a,4a-diaza-s-indacene (BODIPY) based chemosensors, (4) polymer-based chemosensors, (5) DNA-functionalized sensing systems, (6) protein-based sensing systems and (7) nanoparticle-based sensing systems. While the materials are highly sensitive, they often require custom synthesis, an external fluorescence excitation source to visualize color changes, are expensive and in some cases have limited solubility in water. Feng, et al., have demonstrated the use of commercially available water-soluble indicators for toxic metal ions in a sensor array (Feng L., Zhang Y., Wen L., Chen L., Shen Z., et al. "Discrimination of trace heavy-metal ions by filtration on sol-gel membrane arrays." *Chem. Eur. J. Comm.*, 2011, 17:1101-1104.) Other chromophores with high selectivity to Hg(II) are terpyridine derivatives, (Shanmugam R., Gabriel G. J., Smith C. E., Aamer K. A. and Tew G. N., "A highly selective colorimetric aqueous sensor for mercury." *Chem. Eur. J.*, 2008, 14:3904-3907), dithia-dioxa-aza-BODIPY (Yuan M., Li Y., Li J., Li C., Liu X., Lu J., Xu J., Liu H., Wang S. and Zhu D., A colorimetric and fluorimetric dual-mode assay for mercury ion by a molecule." *Organic Letters*, 2007, 9:2313-2316) and bis(ferrocenyl) azine complexes (Díez-Gil C., Caballero A., Ratera I., Tárraga A., Molina P. and Veciana J. "Naked-eye and selective detection of mercury (II) ions in mixed aqueous media using a cellulose-based support," *Sensors* 2007, 7:3481-3488). Ferrocene complexes while highly sensitive are hazardous and not water soluble. A selection of water soluble indicators with moderate to high specificity to Hg(II) and no interference from lead are listed in Table 2. While the indicators are not exclusively specific to Hg(II) they show distinct colors when they complex with the different transition metal ions identified in Table 2 to enable specific visual identification of the metal contaminant.

There is much recent work on nanoparticle gold and silver, although these are typically either for Hg(II) or where the valence state involved is uncertain. These nanoparticle approaches are expensive, but a significant area of development. The nanoparticles react with Hg in one valence state or another in such a way as to generate color centers by forming larger entities—compounds, complexes, or simply larger aggregations of the nanoparticle metal material. The actual cited mechanism involves reduction of the Hg(II) to metallic Hg, so the literature suggests this material is not useful to detect Hg.

Several commercially available coating products have been studied by the DOE for their potential use as fixatives (Roelant D, Lagos L, Shoffner P, Espinosa E and Pena G. Fixatives Applied to Hot Cell Facilities via Remote Sprayer Platform. Technology Demonstration Report ARC-2004-D137-200-16_0 for US Department of Energy through Grant DE-FG01-05EW07033, Jan. 22, 2009). A robotic spray applicator from International Climbing Machines (ICM) was used to investigate the efficacy of three different coatings. The coatings, however, were not evaluated for removability in this study. Independently, the Environmental Protection Agency's National Homeland Security Research Center (NHSRC) has evaluated two strippable coatings for radiological decontamination efficacy, to protect and safeguard an urban population in the event of a dirty bomb (James R. R., Willenberg Z. J., Fox R. V. and Drake J. Bartlett Services Inc. Stripcoat TLC Free™ Radiological Decontamination Strippable Coating. Environmental Protection Agency *Technology Evaluation Report EPA/600/R/-08/099*, September 2008; BHI Energy, http://www.bhienerg-.com/products-and-technology-contamination-control-coatings-stripcoat-tlc-free.htm, 2014, accessed March 2014; James R R, Willenberg Z J, Fox R V and Drake J. Isotron Corp. Orion™ Radiological Decontamination Strippable Coating. Environmental Protection Agency *Technology Evaluation Report EPA/600/R/-08/100*, September 2008.) Table 1 provides an overview of commercially available fixatives and strippable decontamination coatings.

als such as ammonia in the formulations (Gray H. N. and Jorgensen B. "Sensor coatings: Responsive coatings for the detection, identification and removal of surface borne plutonium and uranium." in New Developments in Coatings Technology; Ed. Zarras P. et. al., *ACS Symposium Series*, American Chemical Society, 2007, Ch. 11, 162-175). Responsive, strippable coatings have been developed by DOE researchers for capture of radionuclides. (Gray, ibid; Steward J. B. and Johnston J. M. "Strippable PVA coatings and methods of making the same." US Patent Application 2005/0061357 A1, Mar. 24, 2005) A visible color change and high decontamination efficiencies are reported for uranium and plutonium (Gray, ibid). Smart removable coatings with enzymatic degradation capabilities for chemical warfare agents are also reported. (Walker J. P. and Glidel J. G., "Smart enzyme-containing catalytic peelable coatings," US Patent Application 2010/0273197 A1, Oct. 28, 2010). Green technology-based peelable coatings that can entrap toxic metal contaminants like Hg with high efficiency with visual indication are not available in the market place. Disclosed herein is the development of water-based, color-generating (chemochromic), strippable coatings for the capture and visualization of mercury and other toxic metal contaminants.

SUMMARY

A water-based smart paint formulation is disclosed that can be applied by many coating application procedures including, but not limited to, casting, brushing, dipping, rolling or spraying to form an environmentally friendly remediation coating upon drying in ambient conditions, or if necessary, curing at elevated temperatures. The coating is mechanically durable, offers decontamination capability and is strippable when required. The formulations use water-soluble polymers such as methylcellulose, polyvinyl pyrrolidone (PVP), poly(vinyl alcohol) (PVA), commercially available latex paints or water-based urethanes. These materials soften when warmed above 130° F. and undergo a second order glass transition, becoming soft and pliable

TABLE 1

An Overview of Commercially Available Fixative and Decontamination Coatings

| Product Name | Vendor | Product Description | Characteristics | Coverage/ Removability | Price |
|---|---|---|---|---|---|
| Promar 200 | Sherwin Williams | Latex paint | Fast drying, meant for wall board | 65 sq ft/gal; No | $26/gal |
| Direct to metal (DTM) | Sherwin Williams | 100% acrylic coating | Strong adhesion; fixes surface contaminants | 57 sq ft/gal; No | $32/gal |
| Polymeric Barrier Systems | BHI Energy | Non-toxic water based solution | Barrier encapsulant to trap loose contamination | 54 sq ft/gal; No | $47/gal |
| SheildKote-2010 W.B. | Simco Coatings Inc. | Vinyl-modified plastic resin | Radioactive decontaminant | 26 sq ft/gal Yes | NA |
| StripCoat TLC Free ™ | BHI Energy | Non-toxic strippable coatings | Binds Cs-137; ~32% removal on concrete surface | Easily removed, no tears; lowers solid waste | $78/gal triple coat suggested |
| Orion ™ StripCoat | Isotron Corp. | 2-part concentrate | Binds Cs-137; ~76% Cs-137; removal on concrete surface | Removable, rigid coating tears on rough surfaces | $175/gal; triple coat suggested |

Most of the conventional strippable materials identified in Table 1 are passive entrainment coatings or targeted for binding radionuclides and do not signal the presence or quantity of the contaminant. They are also reported to use carcinogenic solvents and chelators, and hazardous materiwithout actually melting. Polyurethanes are applicable when weather-resistant coatings are required as fixatives on rough surfaces. Poly(ethylene glycol) (PEG), triethylene glycol di-2-ethylhexanoate, glycerol or sorbitol are examples of plasticizers that can be added to the paint for ease of removal from a variety of surfaces (plastic, smooth or porous concrete and drywalls and floors, glass and metals).

Specific commercially available colorimetric agents dissolved in solvents such as water, acetone, reagent alcohol, alpha-terpineol or miscible blends thereof are added to the coating formulation to bind metal transition metal cations such as Hg(II), Pb (II), Cr(VI) and Cd(II) with distinct color chemistries to offer specificity. The color development in the coating for the various metal ions can be enhanced by addition of pH buffers such as pH ~5 from sodium acetate and acetic acid, pH ~8.6 from boric acid and sodium hydroxide in distilled water, and using masking agents such as ethylenediaminetetraacetic acid disodium salt (EDTA), triethylene-tetramine hexaacetic acid (TTHA) and ethylene glycol-2-(aminoethyl) tetraacetic acid (EGTA). Colloidal silver nanoparticles (AgNPs) can be added to the paint to form an amalgam with Hg and sequester the toxic metal in the paint. The agglomeration of the AgNPs upon binding to Hg could also be indicated by a color change similar to color changes in size dependent colloidal dispersions of silver or gold. Stabilizing agents such as non-ionic surfactants include Triton X-100 and Tween-20 are added to improve particle distribution. Ionic surfactants like dodecyl sulfonate (DDS) are used to stabilize the AgNPs. The stabilizing agents and ionic surfactants used in the formulation can aid in drawing the elemental mercury into the aqueous coating to sequester it. The coatings disclosed here can also be sprayed to trap airborne contaminants. For example mercury in the air is reported to be 95% in elemental Hg form and 5% in the reactive form Hg(II) ("Underestimated airborne mercury levels." *Chemical and Engineering News*, Jan. 28, 2013, p. 32). Hence the color change will be indicative of the presence of mercury. The formulation also uses a small amount of a zeolite, such as clinoptilolite, to trap toxic metals that have an ionic radii matching the pore size in the zeolite and are positively charged, such as mercury, cadmium, lead and arsenic. Because the coating is water-based, the ionic metal ($M^{n+}$) species migrates into the coating and away from the contaminated surface. Upon curing the coating (generally for about 16 to 48 hours, preferably 24-48 hours), the binding of the metal is indicated by a visual color change, indicating the presence of the metal ion ($M^{n+}$) in select regions of the coating. The color developed in the coatings can be indicative of specific metal ions and can also be calibrated to a visible detection limit using a standard color wheel to quantify the sequestered contaminant.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure described herein will become apparent from the following detailed description considered in connection with the accompanying drawings, which disclose several embodiments incorporating features of the invention. It should be understood, however, that the drawings are designed for the purpose of illustration and not as limits of the invention.

DETAILED DESCRIPTION

Various embodiments are now described with reference to the drawings. In the following description, for purposes of explanation, numerous specific details are set forth in order to provide a thorough understanding of one or more embodiments. It may be evident however, that such embodiment(s) may be practiced without these specific details. In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Various modifications and alterations of the invention will become apparent to those skilled in the art without departing from the spirit and scope of the invention. It should be noted that steps recited in any method herein do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described herein, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether flow control or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Figure 1:
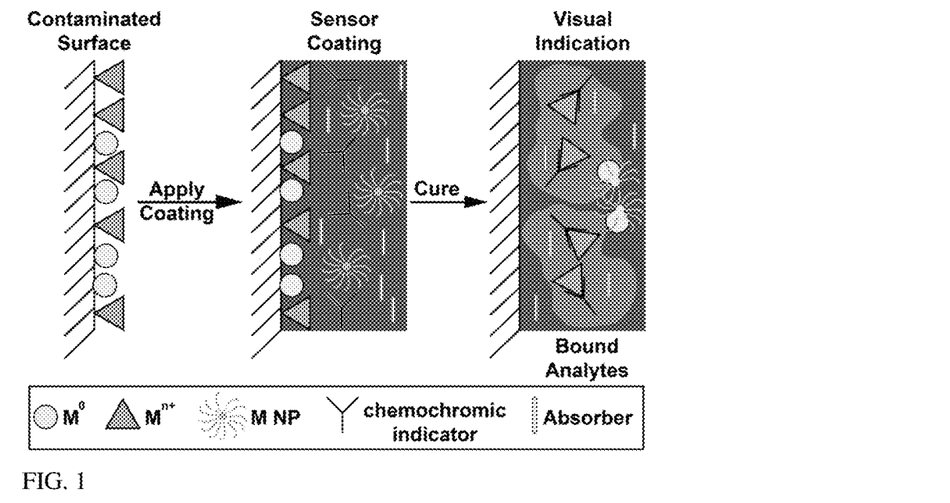
FIG. 1 is a schematic representation of an embodiment of the coating operation. Specific binding events for contaminants (in this example, ionic and elemental metal) are shown through symbols and visible color changes in the coating. The ionic metal species referred to herein are absorbed into the coating, the coating is cured and the presence of the metal ion is shown by a color change representative of the metal ion and/or its concentration.

Referring now to FIG. 1, a preferred embodiment incorporating features of the invention is shown. The coating, which can be in the form of paint or other coating material, is applied to a surface, for example, a contaminated surface or a surface potentially exposed to contaminants. As the coating cures, the coating sequesters contaminants on a substrate surface. The coating formulation reacts colorimetrically to the presence of targeted contaminants to provide a visual indication of the presence of the contaminants. For example, stabilized silver nanoparticles can react with elemental mercury to form an amalgam and sequester it in the coating. Clinoptilolite in the coating traps positively charged toxic metals and sequesters them if they fit the zeolite diameter. The key to the symbols used is also shown.

A preferred embodiment of the present invention is formulated from 0.02-0.3 wt % silver dispersion (Sigma Aldrich), 83-90 weight % DeconPeel 5001, 0.2-1 wt % Triton X-100 and 10-17 weight % deionized (DI) water. DECONPEEL™ is a water based peelable coating available from General Chemical Corp Brighton, Mich. Triton X-100 ($C_{14}H_{22}O(C_2H_4O)n$) is a nonionic surfactant available from Union Carbide having a hydrophilic polyethylene oxide chain (on average 9.5 ethylene oxide units) and an aromatic hydrocarbon lipophilic or hydrophobic group. Embodiments incorporating features of the present invention induce a darkening of the grayish silver dispersion color applied onto polyethylene terephthalate (PET) substrates exposed to metallic Hg. The coating has sufficient mechanical strength to remain intact when stripped from a surface. By optimizing the pH of the emulsion, the colloidal stability of the silver nanoparticles is maintained to form a single phase coating.

The coating can be formulated to colorimetrically indicate the presence of metallic mercury through various configurations, for example, by direct colorimetry through color changes and/or through interaction with fine particle silver (silver dispersion), or through various known reactions. Also, sequestration of Hg can be achieved through constituents that may not have a discernible color change such as absorbers in the paint, for example clinoptilolite.

Embodiments incorporating features of the present invention can include an environmentally friendly, smart coating with embedded colorimetric indicators for contaminants. The decontamination coatings are removable. The coating indicates sequestration of contaminants visually via the color formation that occurs when color-forming chelators or ligands bind to target analytes. The present invention targets the presence of Hg(II), Cr (VI), Cd(II), Pb(II) and elemental Hg but is also applicable to other substances, particularly for waste remediation and environmental cleanup activities. The coating can be adapted for trapping radioactive materials as well.

The specific features offered by the coatings described herein include, but are not limited to:
1. Colorimetric indicators for Hg(II), Cr (VI), Cd(II), Pb(II) and reactive nanoparticles of elemental metals such as Hg in water-soluble polymers or water-based emulsions with zero to minimal volatile organic solvents—a green process that minimizes hazardous waste,
2. Curable coatings with visual indication of contaminant capture, and 3. The formulations can be cast, sprayed, dipped, rolled, painted or brushed on as liquids and cured at room temperature to form peelable freestanding films or sprayed-on as foams to trap aerosolized hazards.

Specifically, embodiments incorporating features of the present invention can utilize water-soluble polymers such as methylcellulose, polyvinyl pyrrolidone (PVP), poly(vinyl alcohol) (PVA), commercially available water-based paints (such as Deconpeel 5001, Booth Coat 5201, PlasticMask 7550) or water-based urethanes that soften when TABLE 2-continued Commercially Available Indicators, their common names and characteristics 3,4-Dihydroxy-9,10-dioxo-2-anthracenesulfonic acid sodium salt (Alizarin S Red)     $\lambda_{abs}$ = 422 nm    Cd 1 Fabretti A. C. and Peyronel G, "Rhodanine complexes of zinc(II), cadmium(II), mercury(II) and mercury(I)." *Spectrochmica Acta*, 1978, 34A:667-671.
2 Fabretti A. C. and Peyronel G, "Nickel(II) and Cobalt(II) Complexes of Rhodanine." *Transition Metal Chemistry*, 1977, 2:207-210.
3 Paradkar R. P. and Williams R. R., "Micellar colorimetric determination of dithizone metal chelates." *Analytical Chemistry*, 1994, 66: 2772-2756.
4 Chromium Hexavalent (Colormetric), EPA Method 7196A Rev 1. July 1992.
5 Ullah M. R. and Enamul Haque M., "Spectrophotometric determination of toxic elements in aqueous media." *Jounal of Chemical Engineering*, IEB, 2010, ChE, 25(1): 1-12.

Colloidal silver nanoparticles (AgNPs) can be formulated into the paint and will form an amalgam with Hg sequestering the toxic metal into the paint. The agglomeration of the AgNPs upon binding to Hg can also be indicated by a color change similar to color changes in size dependent colloidal dispersions of silver or gold. Stabilizing agents such as non-ionic surfactants, for example Triton X-100 and Tween-20 can be added to the formulations to improve particle distribution. Ionic surfactants, such as dodecyl sulfonate (DDS), can be used to stabilize the AgNPs in the formulation. The stabilizing agents and ionic surfactants used in the formulation aid in drawing the elemental mercury into the aqueous coating to sequester it. The coatings disclosed herein can be sprayed to trap airborne contaminants such as elemental mercury. Since airborne mercury is reported to have 95% elemental Hg and 5% in reactive form ($Hg^{2+}$), any observed color change will be indicative of the presence of mercury. The formulation also uses a small amount of zeolite (clinoptilolite—a natural zeolite comprising a microporous arrangement of silica and alumina tetrahedral) to trap toxic metals such as mercury, cadmium, lead and arsenic. Being a water-based coating, the ionic metal ($M^{n+}$) species will migrate into the coating away from the contaminated surface. Upon curing the coating (from about 16 up to about 48 hours), the binding event will be signaled by a visual color change indicating the presence of the ($M^{n+}$) in select regions of the coating. The color development in the coatings can be calibrated to a visible detection limit using a standard color wheel to quantify the sequestered contaminant. A wet thickness from about 0.25 mm to 0.7 mm of the coating is applied by spraying or doctor blading the coating on to the surface. The coating is then cured at ambient room temperature for up to about 48 hours, preferably 24-48 hours depending on the specific formulation and surface type.

One example of a coating incorporating features of the invention is Formulation 1A comprising 0-4% by weight Booth Coat 5201, 5-15 weight % of 1,5-diphenylthiocarbazone (Dithizone) in reagent alcohol, 0-1.5% by weight of clinoptilolite and 79-90% by weight of Deconpeel 5001. The use thereof is shown in FIG. 3, FIG. 4, FIG. 5 and FIG. 6. A second example is Formulation 1B that comprises 0-4% by weight Booth Coat 5201, 10-15 weight % of 1-(2-pyridylazo)-2-napthol in 95:5 deionized water, Triton X-100 and 79-90% by weight of Deconpeel 5001, the use thereof shown in FIG. 7. A third example is coating Formulation 1C that comprises 0-4% by weight Booth Coat 5201, 10-15 weight % of Rhodanine in 80:20 ethanol/water with 20-30% Triton X-100 and 70-85% Deconpeel 5001, the use thereof being shown in FIG. 8.

A fourth example comprises water-soluble polymers such as methylcellulose or Methocel® (MC) (Mw ~41,000) and polyvinylpyrrolidone (Mw ~36,000-55,000) (PVP) in Formulation 2. The new peelable coating formulation comprises a 5:1 mixture ratio with 2-6 weight % MC and 1-3% PVP. These coatings can be applied to various structures, for example, concrete brick, PVC, glass and steel. When dry, the coatings can be peeled from the substrates. The coatings have sufficient mechanical strength to remain intact when stripped from the surfaces, with the possible exceptions of some varieties which have an increased adherence to concrete brick. Viscosity measured by a Brookfield HBVT viscometer ranges from 2% MC+3% PVP ~400-600 cP; 4% MC+3% PVP ~6000-8000 cP, and 6% MC+3% PVP ~26000-28600 cP respectively. A fifth embodiment is Formulation 3A comprising 70-85 weight % PlasticMask 7550, 0-1.5 weight % clinoptilolite, 15-20 weight % alpha terpineol, 0.032-0.128 weight % 1,5 diphenylthiocarbazone (Dithizone), 0.1-2.0 weight % Triton X-100 and 3-6% water. Use thereof is illustrated in FIG. 10, FIG. 11, FIG. 12 and FIG. 13 and FIG. 15.

Figure 14:
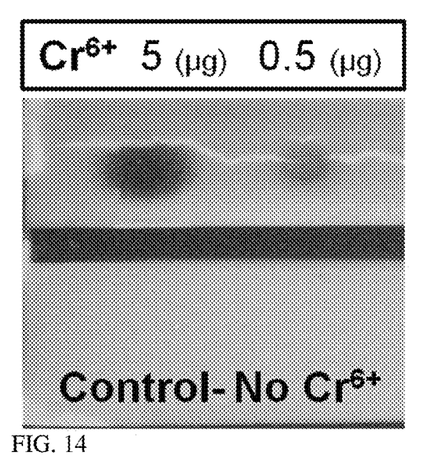
FIG. 14 depicts the coating formulated with 1,5-diphenylcarbazide in another preferred embodiment of the present invention applied to a drywall surface contaminated with an aqueous solution of Cr(VI) containing salt at two different concentrations showing as purple to pink.
Figure 15:
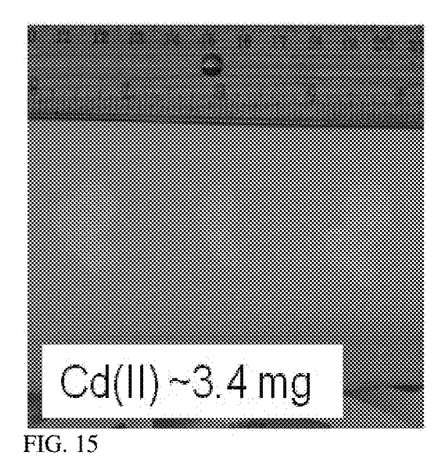
FIG. 15 depicts the coating formulated with 1,5-diphenylthiocarbazone in another preferred embodiment of the present invention applied to a drywall surface contaminated with an aqueous solution of cadmium (II) containing salt, showing as orange.

A sixth example is Formulation 3B comprising 70-85 weight % PlasticMask 7550, 0-1.5 weight % clinoptilolite, 15-20 weight % alpha terpineol, 0.032-0.128 weight % 1,5-diphenylcarbazide, 0.1-2 weight % Triton X-100 and 3-6 weight % water; FIG. 14 shows such composition for detection of Cr(VI).

Dried coating thickness can vary depending on the formulation used, number of layers applied and the substrate type. Table 3 lists coating thickness measurements based on these variables for the various formulations. The resulting coatings are peelable using moderate force.

TABLE 3

Thickness Measurements for Peeled Coatings
Peeled film thicknesses (mm)

| Formulation ID | From Glass | From PVC | From Concrete | From Steel |
|---|---|---|---|---|
| 1A | 0.12-0.22 | 0.17-0.26 | 0.19-0.36 | 0.12-0.25 |
| 1A | 0.11-0.19 | 0.13-0.21 | 0.29-0.59 | 0.14-0.33 |
| 1A | 0.20-0.41 | 0.19-0.37 | 0.39-0.63 | 0.17-0.37 |
| 2 | 0.3-0.96 | 0.3-0.96 | Not peel able | 0.3-0.96 |
| 3 | NA | NA | 0.25-0.75 | NA |

Figure 2:
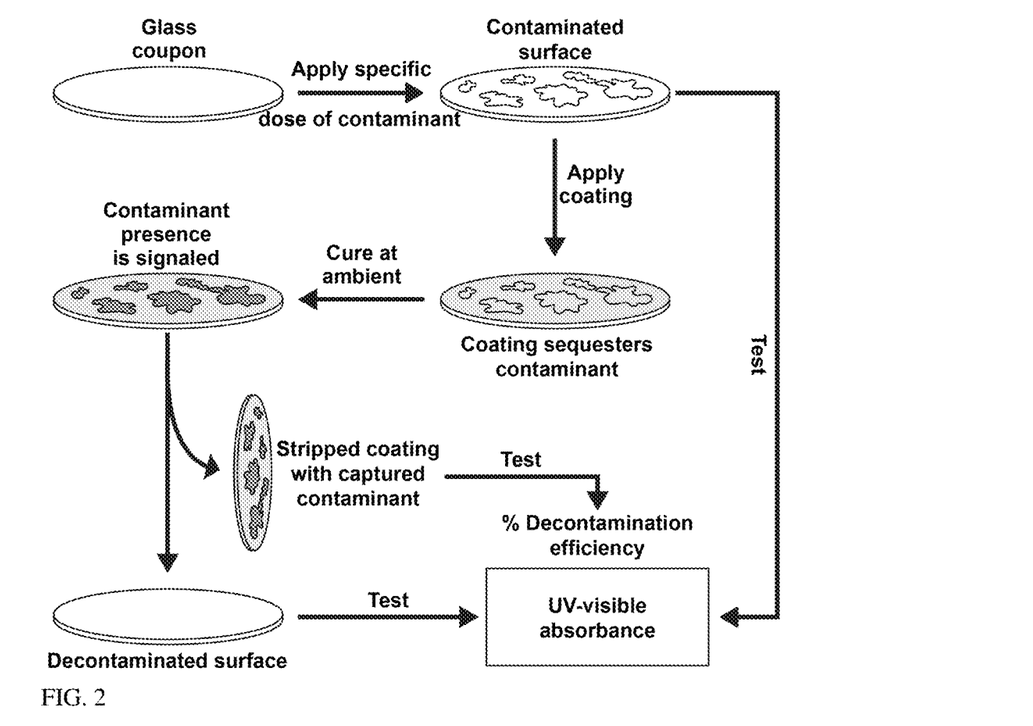
FIG. 2 depicts the use of the coating based on a test protocol. As indicated, the contaminant on a substrate is absorbed by the coating formed on the substrate surface. The coating is dried or cured and the presence of the contaminate is indicated. The coating can then be removed leaving the original substrate decontaminated and the removed coating can be analyzed.
Figure 3:
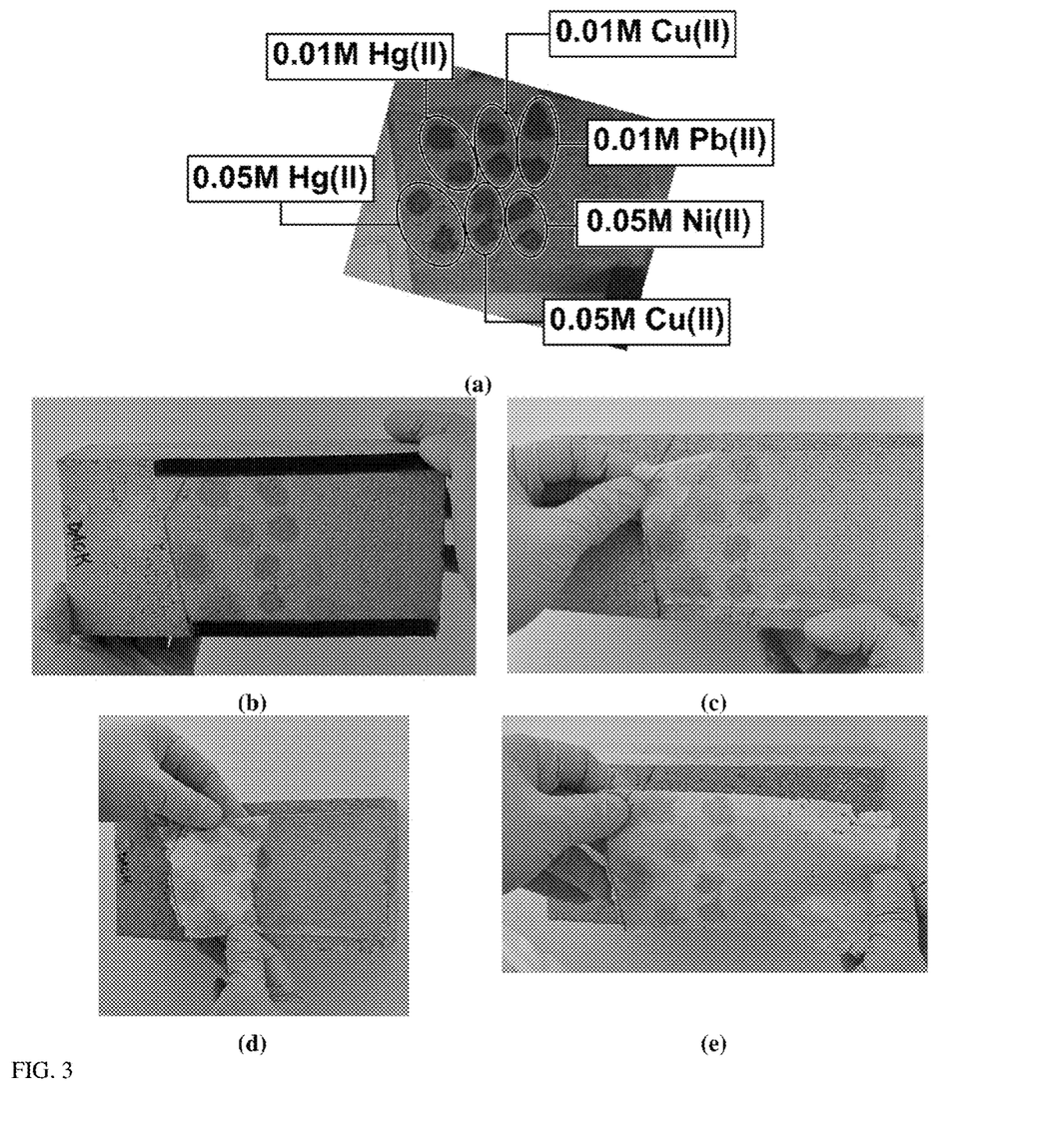
FIG. 3 depicts coating and peeling of a preferred embodiment of the present invention from porous cement brick with resulting color changes where:
(a) depicts the regions deposited with 0.05 mL each of aqueous salt solutions of 0.01 M and 0.05 M $Hg^{2+}$, 0.01 M and 0.05 M $Cu^{2+}$, 0.05 M $Ni^{2+}$ and 0.01 M $Pb^{2+}$,
(b) depicts the surface after applying and drying of a coating formulated with 1,5-Diphenylthiocarbazone (Dithizone) indicator, the Hg ion showing as pink and the Cu ion showing as gray,
(c) depicts the initial peel off of a surface,
(d) shows the surface when the coating is peeled partially off, and
(e) depicts the result, with the invention completely removed from porous cement brick.
Figure 4:
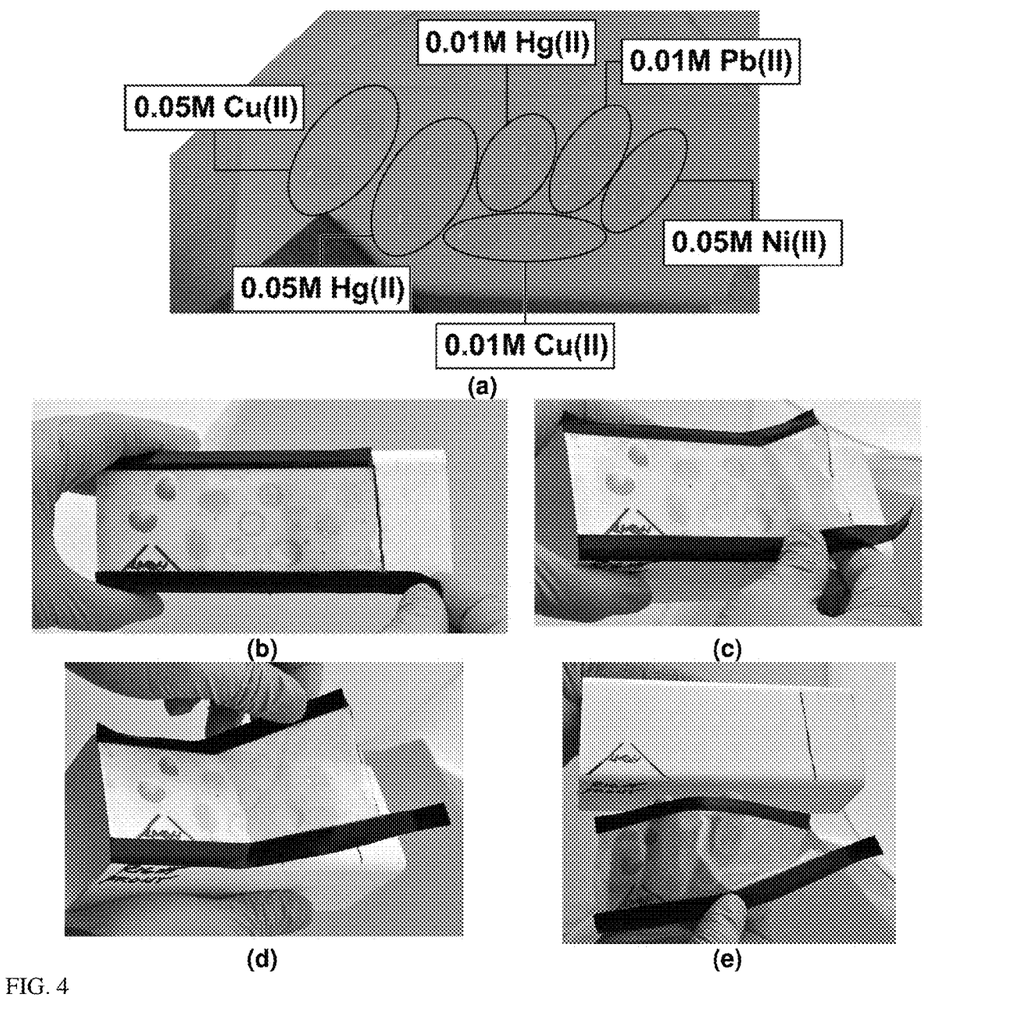
FIG. 4 depicts coating and peeling from a polyvinyl chloride (PVC) pipe surface with a preferred embodiment of the present invention showing color changes where
(a) depicts the regions deposited with 0.05 mL each of aqueous salt solutions of 0.01 M and 0.05 M $Hg^{2+}$, 0.01 M and 0.05 M $Cu^{2+}$, 0.05 M $Ni^{2+}$ and 0.01 M $Pb^{2+}$,
(b) depicts the surface after applying and drying of a coating formulated with 1,5-Diphenylthiocarbazone (Dithizone) indicator, the Cu ion showing as blue or green depending on concentration, the Hg ion showing as pink and the Ni ion showing as a light blue.
(c) depicts the initial peel off of a surface,
(d) shows a surface when the coating is peeled partially from the surface, and
(e) depicts the result, with the coating completely removed from a PVC substrate surface.
Figure 5:
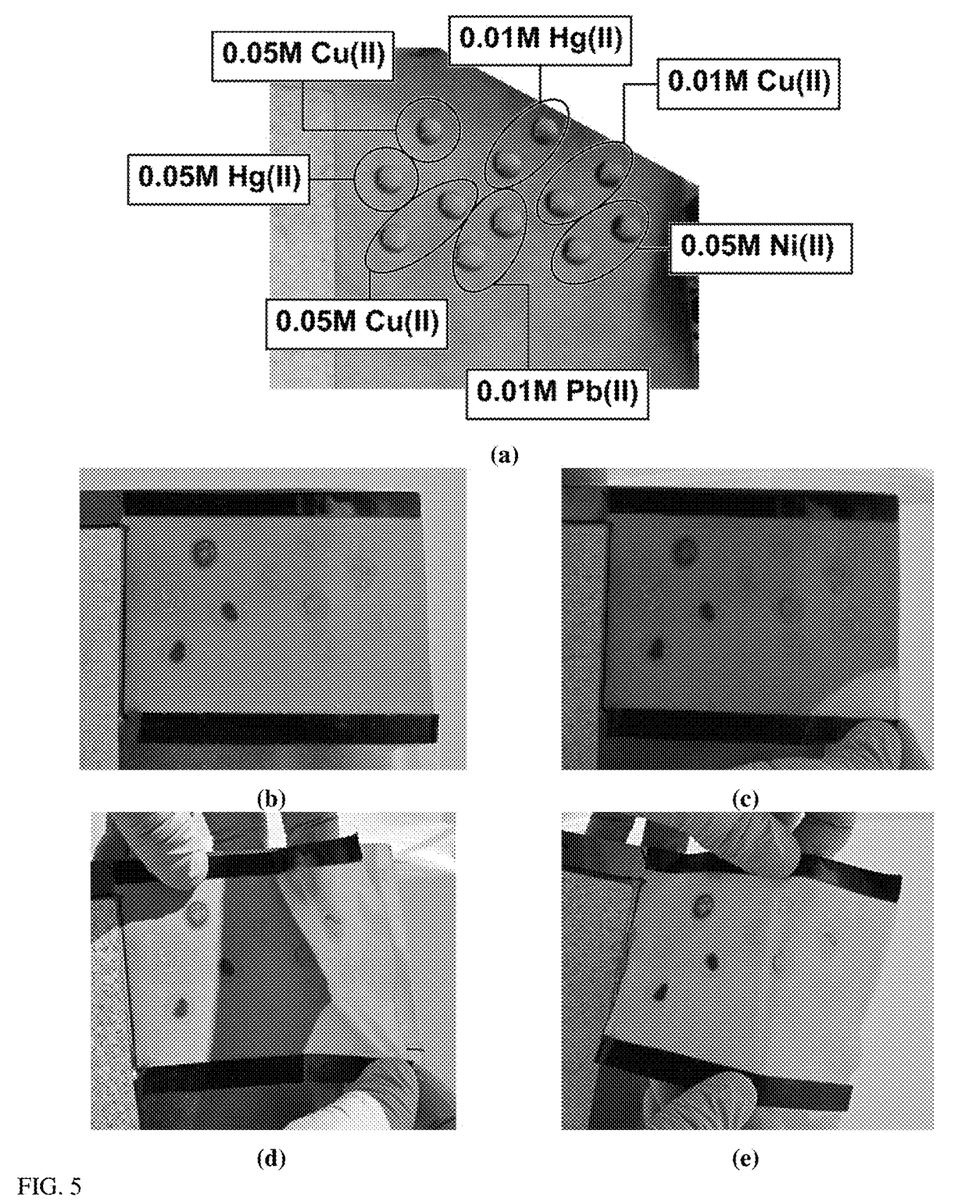
FIG. 5 depicts coating and peeling from stainless steel with a preferred embodiment of the present invention showing color changes where
(a) depicts the regions deposited with 0.05 mL each of aqueous salt solutions of 0.05 mL each of 0.01 M and 0.05 M $Hg^{2+}$, 0.01 M and 0.05 M $Cu^{2+}$, 0.05 M $Ni^{2+}$ and 0.01 M $Pb^{2+}$,
(b) depicts the surface after applying and drying a coating formulated with 1,5-Diphenylthiocarbazone (Dithizone) indicator, the Cu ion showing as blue or green/brown depending on concentration and the Hg ion showing as pink,
(c) depicts the initial peel off of the surface,
(d) shows the surface when the coating is peeled about half way, and
(e) depicts the result, with the coating completely removed from the stainless steel surface.
Figure 6:
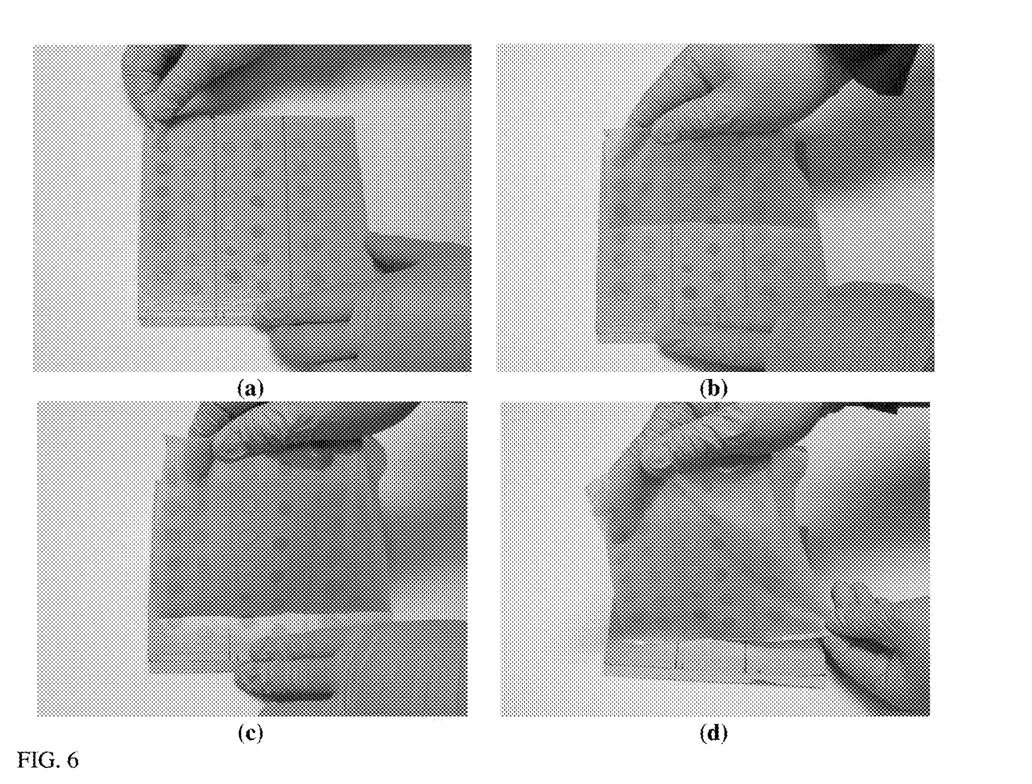
FIG. 6 depicts coating and peeling from painted drywall with a preferred embodiment of the present invention showing color changes on a drywall surface where
(a) depicts the surface following deposit of 0.05 mL serially diluted 0.01 M and 0.05 M $Hg^{2+}$ (top panel), 0.01 M and 0.05 M $Cu^{2+}$ (middle panel), 0.05 M $Ni^{2+}$ and 0.01 M $Pb^{2+}$ (bottom panel) and the application and drying a coating with 1,5-Diphenylthiocarbazone (Dithizone) indicator, the Hg ion showing as pink or orange, the Cu ion showing as green to brown and the Pb ion showing as gray, (b) depicts the initial peel off of the surface, (c) shows the surface when the coating is peeled about half way, and (d) shows the surface with the coating completely removed from a painted drywall.

FIG. 2 depicts an example test protocol used to validate the contamination efficiency of the coatings. The chromogenic indicator used is Dithizone applied to Formulation 3. Mercuric chloride was used as the source for Hg(II) ions to develop a standard curve. The concentrations used in establishing the standard curve ranges from 2 μg to 10 μg with 10% intervals. 0.1 μmol dithizone in acetone was prepared, which equals to 25.6 μg Dithizone in the reaction volume. The standard curve was generated through direct reaction of Hg (II) with Dithizone in acetone. Hg (II)-Dithizone complex can be immediately measured using a UV-visible spectrometer. Glass Petri Dishes can be used as test coupons; 0.05 mL of water and 1 M $HgCl_2$ stock solution can be deposited on the surface separately and allowed to dry for 24 hours before applying the coating. 2 g of coating formulation can then be deposited onto the petri dishes. After the coating is sufficiently dried, usually 24 hours, it can be removed and color changes inspected and photographed. Pink color formation is visible to the eye where Hg (II) is present.

After peeling away the smart coating, the surface can be rinsed with 1 mL of 0.1 μmol Dithizone indicator solution in acetone, collected in a beaker and then transferred into cuvettes. The collected rinsates can be characterized by UV/VIS absorption spectroscopy. A calibration curve can constructed using measurements made from serial dilutions of the stock solutions and a regression function generated from standard curve can be used to calculate the detectable residual metal ion concentrations on the test coupon surface after the coating has been stripped.

Example 1—Detection and Peelability Testing

Testing was conducted using 0.05 mL of two concentrations of metal ion solutions (0.01 M and 0.05 M solutions of $Hg^{2+}$, $Cu^{2+}$ and $Ni^{2+}$) drop cast on various substrates (porous cement brick, PVC, stainless steel and painted drywall). Although testing was conducted for these contaminants, it should not be concluded that the present invention is limited to these contaminants. The calculated weights for the metal ions are shown in Table 4. Coating Formulation 1A was applied to these metal ion contaminated substrates. Referring to FIG. 3, FIG. 4, FIG. 5 and FIG. 6, the images show the colorimetric reaction of the present invention to various metal contaminants. The figures also depict the coating technology application and removal from porous cement brick, PVC, stainless steel and painted drywall.

TABLE 4

Calculated Weights of Dried Metal from 0.05 mL Solutions

| | Calculated Weight of Dried Metal from 0.05 cc Solutions (mg) | | |
|---|---|---|---|
| Concentration (M) | Hg | Cu | Ni |
| 0.01 | 0.1003 | 0.0318 | 0.0293 |
| 0.05 | 0.5015 | 0.1589 | 0.1467 |

Figure 7:
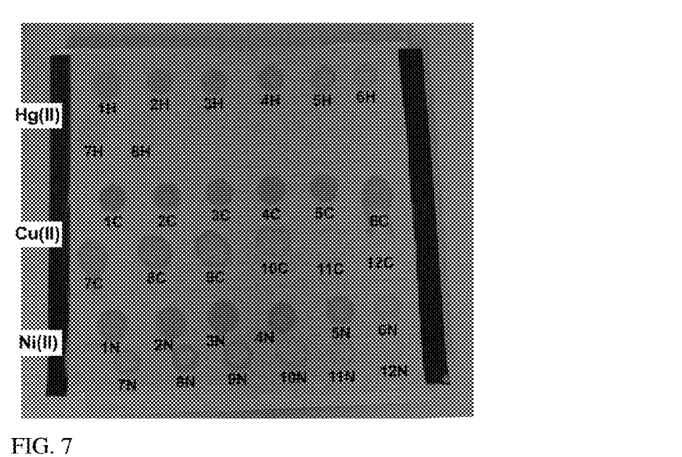
FIG. 7 depicts coating formulated with 1-(2-pyridylazo)-2-napthol as another preferred embodiment of the present invention applied to a drywall with surface. The color changes are for Hg (pink), Cu (blue to pink) and Ni (pink to orange) ions shown where the increasing numbers are representative of decreasing metal ion concentration in the spotted regions.
Figure 8:
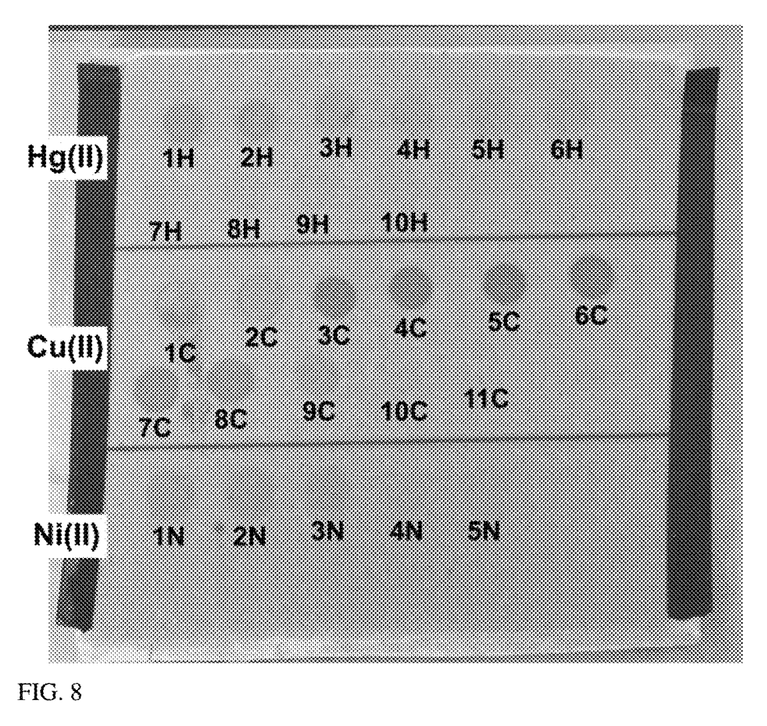
FIG. 8 depicts coating formulated with 5-(4-dimethylaminobenylidene) rhodanine in another preferred embodiment of the present invention applied to a drywall surface. The color changes for Hg (orange), Cu (green to orange) and Ni (gray) ions are shown with increasing numbers representative of decreasing metal ion concentrations in the spotted regions.
Figure 9:
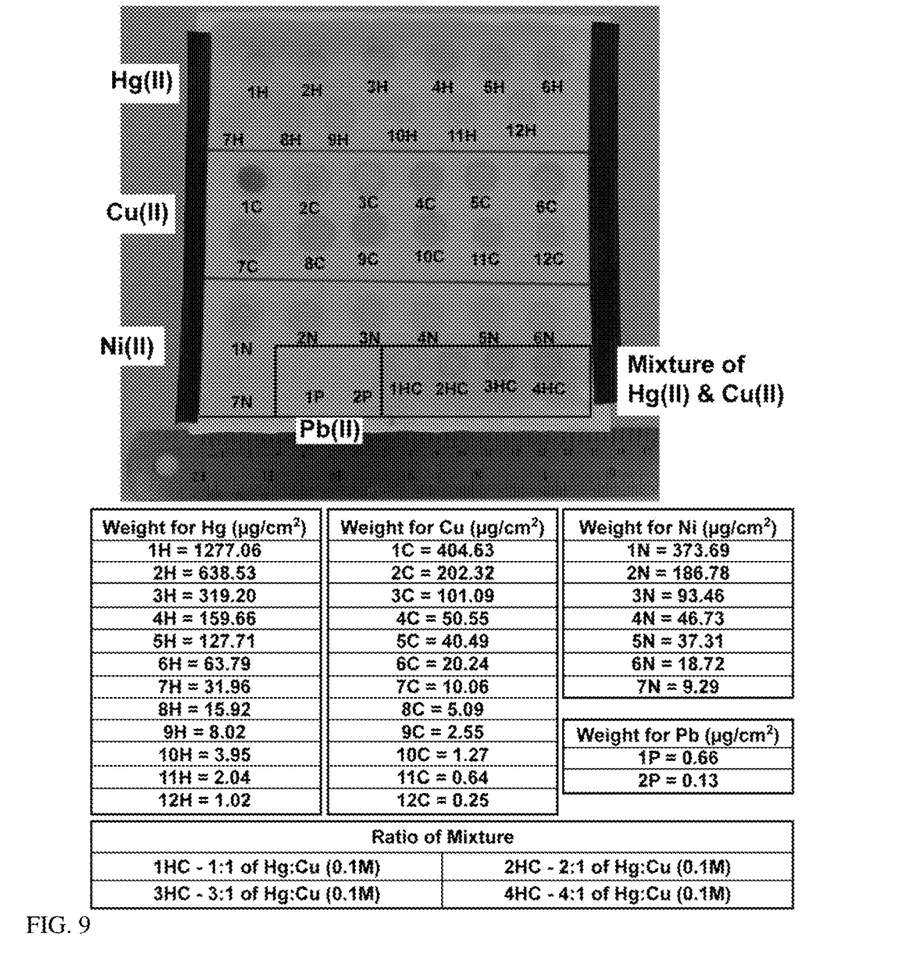
FIG. 9 depicts a coating formulated with 1,5-Diphenylthiocarbazone in another preferred embodiment of the present invention applied to a drywall surface. The color changes for Hg (pink to orange), Cu (brown/green to gray), Pb (not visible) and a mixture of Hg and Cu (green to gray with a pink ring) ions are shown with increasing numbers representative of decreasing metal ion concentrations in the spotted regions. Influence on specific color development from co-existing metal ions is shown for various ratios of Cu(II) and Hg(II) in the example. The Table included therein identifies the ion concentrations colorimetrically shown in the Figure.
Figure 10:
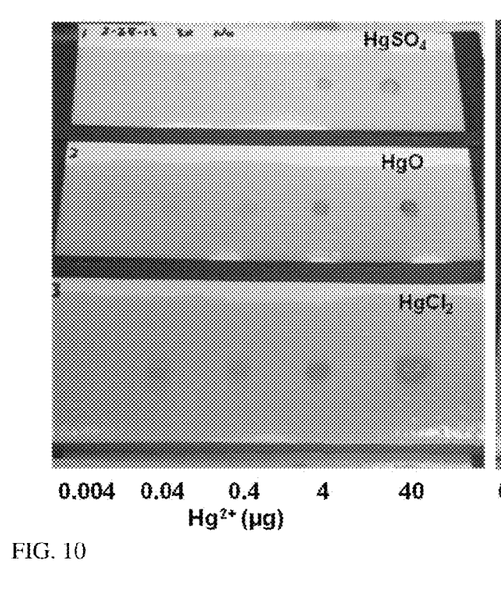
FIG. 10 depicts the coating formulated with 1,5-diphenylthiocarbazone in another preferred embodiment of the present invention applied to a drywall surface contaminated with mercury (II) compounds, namely mercuric chloride, mercuric oxide and mercuric sulfate in decreasing concentrations from right to left (40 μg to 40 ng) al showing as pink.
Figure 11:
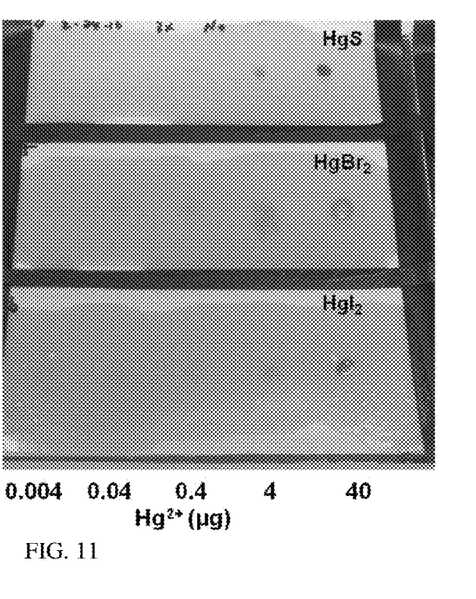
FIG. 11 depicts the coating formulated with 1,5-diphenylthiocarbazone in another example of the present invention applied to a drywall surface contaminated with mercury (II) compounds, namely mercuric bromide, mercuric iodide and mercuric sulfide in decreasing concentrations from right to left (40 μg to 40 ng).
Figure 12:
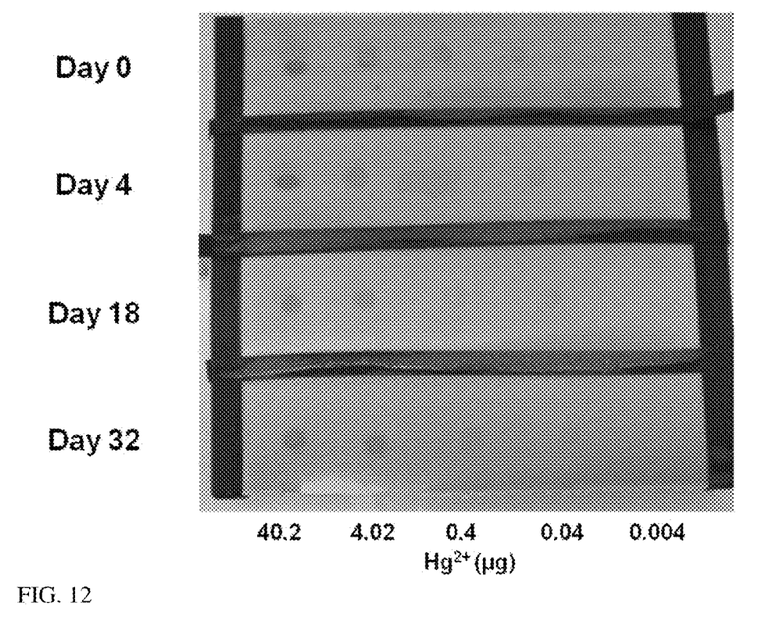
FIG. 12 depicts the coating formulated with 1,5-diphenylthiocarbazone in another example of the present invention applied to a drywall surface contaminated with mercury (II) chloride as a function of coating age from day 0 through day 32, showing as pink to orange depending on decreasing concentration.

Testing was also conducted using 0.05 mL of two concentrations of metal ion solutions (0.01 M and 0.05 M solutions of $Hg^{2+}$, $Cu^{2+}$ and $Ni^{2+}$) drop cast on painted drywall. Coating Formulation 1B was applied to these metal ion contaminated substrates. Referring to FIG. 7, the image shows the colorimetric reaction of the present invention to various metal contaminants. The visible limit of detection (LOD) was 15.92 μg/cm² for Hg(II), 0.25 μg/cm² for Cu(II) and 0.59 μg/cm² for Ni(II). Coating Formulation 1C was applied to these metal ion contaminated substrates. Referring to FIG. 8, the image shows the colorimetric reaction of the present invention to various metal contaminants. The visible limit of detection (LOD) was 63.79 μg/cm² for Hg(II), 2.55 μg/cm² for Cu(II) and 93.46 μg/cm² for Ni(II). The visible LOD for coating Formulation 1A can be inferred from FIG. 9 as follows: 1.02 μg/cm² for Hg(II), 0.25 μg/cm² for Cu(II) and 18.72 μg/cm² for Ni(II).

Testing was also conducted using aqueous potassium dichromate as a source of Cr(VI) and Cadmium sulfate as a source of Cd(II) and applied to a painted dry wall. Formulation 3B showed a deep purple color against a pale pink background paint color for Cr (VI) tested at concentrations of 5 and 0.5 μg/cm². Formulation 3A shows a tan-pink color developed against a tan background to indicate the presence of Cd(II) concentration at 3.14 mg/cm².

Testing was also conducted with Formulation 3A using various soluble and insoluble mercury compounds (mercuric chloride, mercuric sulfate, mercuric iodide, mercuric bromide, mercuric oxide and mercuric sulfide) aqueous solutions or suspensions applied to a painted drywall. The visible LODs could be inferred as ~40 ng/cm² for mercuric sulfate, ~4 ng/cm² for mercuric oxide and ~40 ng/cm² for mercuric chloride from FIG. 10 and ~4 μg/cm² mercuric sulfide and ~4 ng/cm² each for mercuric bromide and mercuric iodide from FIG. 11.

Testing was also conducted with Formulation 3A using mercuric chloride applied to a painted drywall and ranging in concentration from 40 ug/cm² to 4 ng/cm². Dried coatings were placed in room ambient and observed for color fading over time at the following intervals (0, 4, 18 and 32 days). The Visible LOD remained unchanged at 40 ng/cm² for all the observed time periods shown in FIG. 12.

Figure 13:
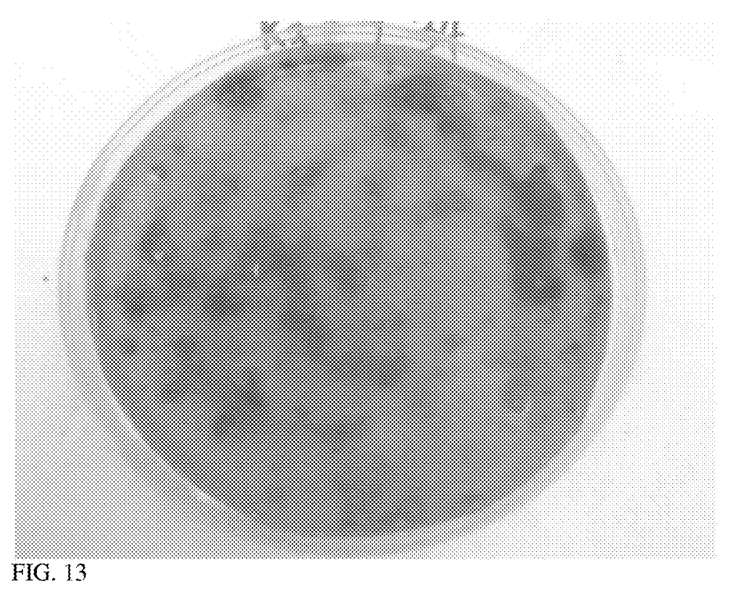
FIG. 13 depicts the coating formulated with 1,5-diphenylthiocarbazone in another example of the present invention applied to elemental mercury contaminated soil from a site identified as the Y-12 site.

Testing was also conducted with Formulation 3A applied to elemental mercury contaminated soil from a field test site (Y-12 complex) in the form of samples provided by the Oak Ridge National Laboratory. A known quantity of the contaminated soil sample was placed in a Petri Dish and a known quantity of Formulation 3A was applied over the soil. FIG. 13 shows the pink coloration that developed in different regions of the dried paint. The sequestered elemental mercury and any oxidized forms in the paint complex with Dithizone to form the pink color observed.

Figure 16:
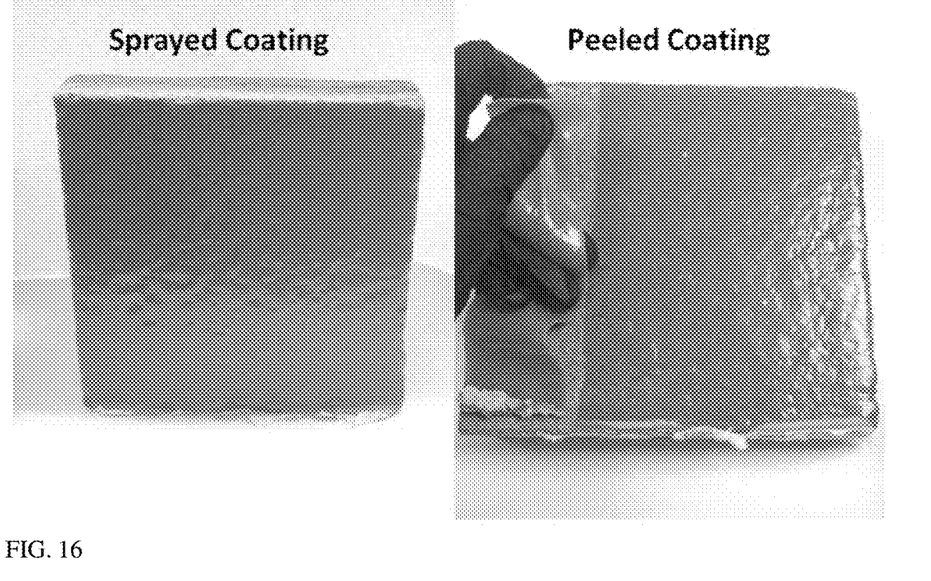
FIG. 16 depicts the coating formulated with 1,5-diphenylthiocarbazone in another preferred embodiment of the present invention that is sprayed onto a porous concrete surface (A), the dried coating peeled, as shown in (B), easily by hand from the concrete surface.

Testing was also done to fine tune Formulation 3A for spray application and peel ability from concrete walls. A Wagner Power Paint Pro airless spray gun was used for this test with formulation viscosities ranging from 7000-10000 centipoise (cP). Dried film thickness for one layer ranged from ~0.2-0.35 mm and was ~0.5-0.75 mm for a 2 layer coating by varying the viscosities and spray conditions. FIG. 16 shows an example of a 2-layer sprayed coating partially peeled from the porous concrete block. The coating is peel able by hand with moderate force.

Figure 17:
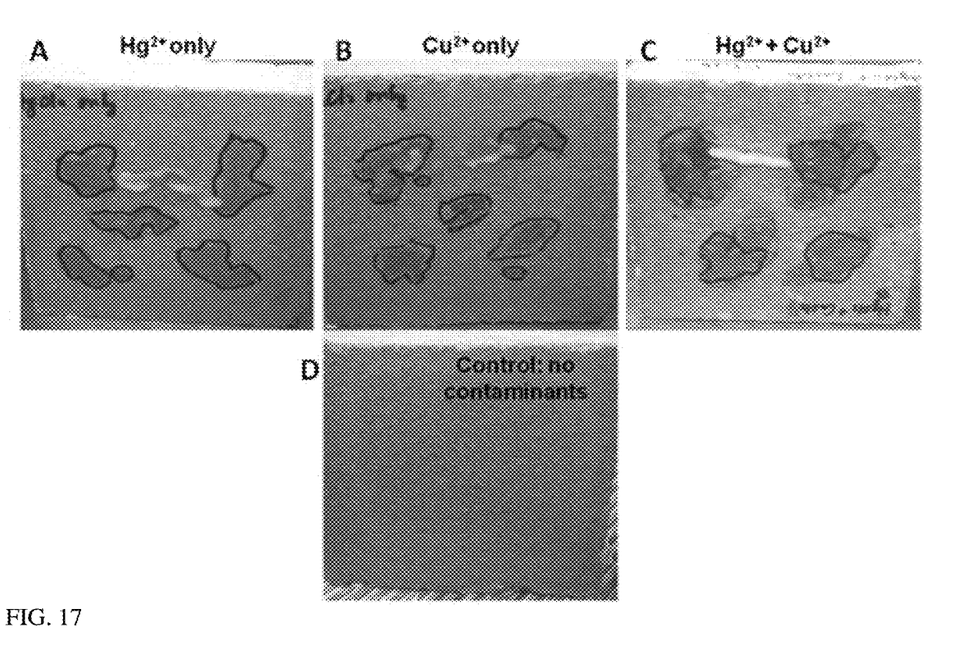
FIG. 17 depicts the selective color development in a sprayed coating on a porous concrete surface pre-contaminated with mercuric chloride (A) showing as orange, cupric chloride (B) showing as gray/green, a mixture of mercuric chloride and cupric chloride (C) showing as a combination of orange and gray, and a control coating (D) with no contaminant.

Testing was also done to investigate the ability of spray applied Formulation 3A to show color formation in the porous concrete wall that is contaminated with mercuric chloride, cupric chloride, a mixture of cupric chloride and mercuric chloride and an uncontaminated surface (control). It can be inferred from FIG. 17a that a pink color develops in the paint in the presence of Hg(II) while FIG. 17-(b) shows a blue color develops in the presence of Cu(II). Both colors are visible in FIG. 17-(c) when both contaminants are present on the concrete surface while no additional color develops in the control coating (FIG. 17-(d)).

What is claimed is:

1. A coating formulation for application to a surface, said coating formulation including one or more colorimetric indicators, the one or more colorimetric indicators exhibiting metal specific color changes in the presence of metallic contaminants on said surface comprising 70-85 weight % of water soluble plastics, water-based paints or water-based urethanes, 0-1.5 weight % of a zeolite, 15-20 weight % alpha terpineol, 0.032-0.128 weight % 1,5-diphenylthiocarbazone (Dithizone), 0.1-2 weight % of a surfactant and 3-6 weight % water.

2. The coating formulation of claim 1 wherein the film shows a color change from pale yellow to localized regions of pink in the presence of elemental and mercury(II) species sequestered in the coating and a color change from tan to localized regions of tan-pink in the presence of Cadmium(II) species sequestered in the coating.

3. The coating formulation of claim 1 wherein the film is cured for 24 to 48 hours at room temperature or for lesser time at elevated temperatures.

4. The coating formulation of claim 1, said film peeled from the surface by mechanical means with moderate force.

5. The coating formulation of claim 1 where the dried peeled film has a thickness from 0.2-0.35 mm for a single layer and 0.5-0.75 mm for two-layer spray applied coatings.

6. The coating formulation of claim 1 wherein the zeolite is Clinoptilolite.

7. A coating formulation for application to a surface, said coating formulation including one or more colorimetric indicators, the one or more colorimetric indicators exhibiting metal specific color changes in the presence of metallic contaminants on said surface comprising 70-85 weight % of water soluble plastics, water-based paints or water-based urethanes, 0-1.5 weight % of a zeolite, 15-20 weight % alpha terpineol, 0.032-0.128 weight % of 1,5-diphenylcarbazide, 0.1-2 weight % of a surfactant and 3-6 weight % water 17.

8. The coating formulation of claim 7 wherein the film shows a color change from pale pink to localized regions of purple in the presence of Cr(VI) species sequestered in the coating.

9. The coating formulation of claim 7 wherein the film is cured for 24 to 48 hours.

10. The coating formulation of claim 7, said film peeled from the surface by mechanical means with moderate force.

11. The coating formulation of claim 7 wherein the zeolite is Clinoptilolite.

* * * * *